May 10, 1966  J. ULDERUP  3,250,557
JOINT CONSTRUCTION
Filed Oct. 7, 1964
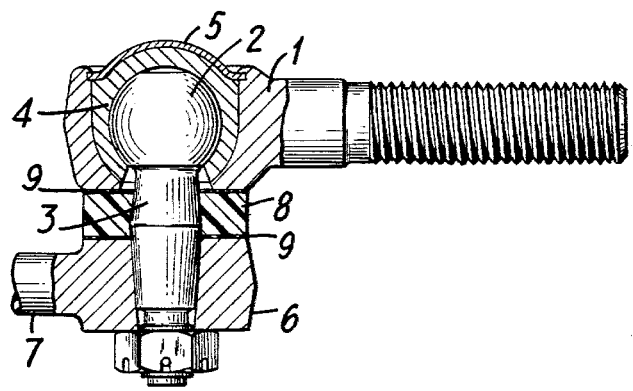
INVENTOR.
JÜRGEN ULDERUP
BY
McGlew & Toren
ATTORNEYS.

United States Patent Office 3,250,557
Patented May 10, 1966

3,250,557
JOINT CONSTRUCTION
Jürgen Ulderup, Bergstrasse, Lemforde,
Hannover, Germany
Filed Oct. 7, 1964, Ser. No. 402,201
Claims priority, application Germany, Dec. 19, 1963,
U 10,352
2 Claims. (Cl. 287—90)

This invention relates in general to universal joint construction and, in particular, to a new and useful universal joint particularly for steering linkages in motor vehicles including a hinge pin with a spherical spring-loaded head which is mounted for universal movement in a housing having an annular plug of elastic material compressed between the stationary linkage of the mechanism and the joint housing.

In universal joints of the type with which the present invention is concerned, a special spring is generally provided for the positive fixing of the ball end of the mechanism in the housing therefor. The spring is arranged to bear, on the one end on the cap forming the upper closure of the housing and, on the opposite end, directly or indirectly against a connecting linkage. In some instances, specially designed linings of elastic material such as rubber or rubber-like materials are provided in the joint housing in order to obtain the desired automatic readjustment and in order to balance the dangerous play between the joint parts, which slide relative to one another. The accommodation of the elastic means inside the joint housing requires either a complicated design of housing and the closing of the cap at its upper outlet, or other constructional measures which make the joint rather complicated and expensive.

In addition, the known embodiments are incomplete unless sufficient lubricant is provided, requiring constant attendance unless a seal is also provided for the joint housing to prevent the penetration of dust and dirt.

Attempts have been made to employ sealing plugs of cellular material which are arranged between the joint housing and the bearing lug of a steering lever or a connecting linkage. Such annular sealing plugs are dimensioned so that they are inserted under an initial compression or stress which is just sufficient to prevent the detachment of the seal from the faces of the joint housing and of the connecting linkage during movement of the joint. Such a joint seal is very simple and is easy to assemble, since no special means for securing the seal are required, in contrast to the other known seals. A further advantage of annular plug seals is that they are suitable for receiving a larger lubricant supply in order to obtain permanent lubrication, without requiring a special grease chamber which is required, for example, with a bellows type of seal. The bellows seal also requires a certain shape, which increases the manufacturing costs. Additionally, because of their thin walls, bellows type seals are much more susceptible to breakage.

In accordance with the present invention, there is provided a universal joint construction characterized by a design which insures adequate lubrication and desired self adjustment at the same time. The invention thus resides substantially in that an annular sealing plug held between the parts under compression serves at the same time as an elastic element and provides automatic readjustment of the joint.

In a preferred arrangement of the invention, the universal joint includes a housing in which the ball is universally movable and an annular sealing plug disposed between the housing and a connecting linkage, which linkage is connected to the ball through a pin extension thereof. The sealing plug advantageously comprises a highly elastic material with a cellular structure including cells which are partly open and partly closed. A portion of the closed cells can be preferably half or all of the cells. It is advantageous to provide an inner region of the plug wall which tightly encloses the hinge pin with open cell structures while the structure of the material in the outer circumferential region of the plug consists of closed cells. It is also possible to employ a cell elastic material having open and closed cells distributed evenly over the entire range of the seal. By using a material with a relatively large number of closed and, if necessary, gas-filled cells, the pressure contact necessary for the automatic adjustment of the ball is increased and, at the same time, the damping of the vibrations caused in the operation, is enhanced. The sealing plug can therefore be made relatively inexpensively.

The invention thus provides primarily an element that is particularly suitable for sealing and for obtaining a greater freedom of operation of universal joints without requiring continuous lubrication and, at the same time, provides means for automatically adjusting the joint.

In accordance with another aspect of the invention, the faces of the annular plug member which are maintained under high contact pressure, are coated or provided with a layer of material having a low frictional value, permitting sliding movement of the seal on the bearing surfaces at least during major deflections of the ball element, in an action which ensures that no molecular movement of the material distorting the seal will take place and there will be no danger that the sealing surfaces of the plug will be detached from the surfaces which are sealed. It has been found to be of particular advantage in accordance with the invention to provide the sealing plug of a plastic material taken from a group of cross-linked polyaddition products, for example, polyurethane. The sliding layers at each end of the plug may also consist of the same material but, in such a case, they would have a homogeneous structure. In some instances it is desirable to form the sliding layers of another material with a low frictional value in order to obtain high sliding properties, if necessary with the addition of other known substances such as molybdenum disulfide.

Accordingly, it is an object of the invention to provide an improved universal joint construction.

A further object of the invention is to provide a universal joint which includes a sealing plug located between the housing for the ball of the joint and an articulated part, which plug is advantageously made of a cellular material which may be subjected to a high compressive stress to seal the parts.

A further object of the invention is to provide a universal joint construction with a sealing plug of varying density arranged to surround a pin of an articulated ball joint member of the joint, and being compressed between the parts for ensuring a seal during the articulation of the ball joint.

A further object of the invention is to provide a universal ball joint which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only figure of the drawing is a partial transverse sectional and elevational view of the universal joint constructed in accordance with the invention.

Referring to the drawing, the invention embodied therein comprises a universal joint having a member defining a cup-shaped housing 1 in which the spherical head 2 of a connecting pin 3 is supported for universal movement. Between the spherical surfaces of the pin head and the inner wall of the joint housing 1 are provided bearing linings 4 which can be formed of steel, metal or other suitable elastic material. The upper part of the housing is sealed by a cap 5 of a material such as sheet metal. In some instances the bearing 4 comprises two bearing boxes or bearing races.

In accordance with the invention, an annular plug 8 is provided as a seal between the joint housing 1 and a lug 6 of a steering lever 7 or of a steering linkage or similar linkage. The annular plug 8 comprises a highly elastic material, preferably of a cellular polyurethane plastic, having a structure formed of a relatively large number of closed cells. The annular plug is inserted in the stationary position of the joint under a compressive stress so that the hinge pin 3 is always under a compressive load due to the tensional force of the sealing plug caused by this initial stress. This force suffices to effect an automatic equalization of any bearing clearance between the ball head 2 and the lining 4. In order to ensure that the smooth run of the joint is not disturbed, particularly with major angular deflections, the annular plug 8 is also provided at one or more surfaces such as the surfaces which face the joint housing 1 and the steering lever lug 6, with a cover or layer 9 of a material having a low frictional value. These sliding layers can be formed, for example, of a plastic with a homogeneous structure. If necessary, known lubricants such as molydenum disulfide may be included in the structure.

Due to the invention it is possible to use a structural element to seal the joint housing in such a way that the special elastic means necessary for the automatic readjustment of the joint can be eliminated and no other construction or other expensive measures are required to achieve the common object of a positive seal, maximum freedom of operation, and satisfactory self adjustment with a minimum of maintenance required. By the special shaping and variation of the hardness and porosity of the sealing plug, the amount and characteristics of the initial stress can be adapted to the respective use according to the invention.

While a specific embodiment of the invention has been shown and described in detail to illustrate the application of the inventive principles, it will be understood that the invention may be embodied otherwise without departing from such principles.

What is claimed is:

1. A universal joint construction, particularly for steering linkages of motor vehicles, comprising a housing having a substantially cylindrical cavity with a reduced end portion at one end providing a lower circular opening and an annular outer planar end surface on said housing surrounding said lower circular opening in said cavity; a ball stud having a substantially spherical head at one end received in said cavity and a stem extending from said head outwardly through said lower circular opening; a bearing liner in said cavity completely enclosing said head except for an opening in said liner aligned with said lower circular opening, the opening in said liner and said lower circular opening being contiguous and flaring outwardly away from the stem to provide clearance for tilting of said stem and said stem portion extending through said openings also being tapered toward the spherical head to allow for an increased angle of tilt for the stem; a metal closure cap having a spherically concave inner portion engaged with said liner above said head and secured in and closing an upper circular opening in the other end of said housing; a linkage member having an apertured eye portion receiving said stem therethrough and having an annular upper planar surface opposed to said outer planar end surface on the housing; an annular sealing plug with its inner periphery surrounding and gripping all portions of the stem extending from said annular outer planar end surface to said annular upper planar surfaces, and having its opposite end surfaces engaged with said annular outer planar end surface and said annular upper planar surface, respectively; fastening means engaged between said stem and the lower surface of said eye portion; said plug comprising cellular resilient synthetic foam resin and being compressed between said annular planar surfaces, to seal the joint and exert a springtightening action on the joint, by tightening of said fastening means, said plug having the inner region of the wall which tightly encloses the stem formed of open cell structures while having the material in its outer circumferential region consisting of closed cell structures, and having its end surface portions composed of a solid synthetic resin bearing material having a low coefficient of friction, and with molybdenum disulphide incorporated therein.

2. A universal joint according to claim 1, wherein the bearing material at the end surfaces of said plug consists of one of the following: polyurethane, polyamide and polytetrafluorethylene.

References Cited by the Examiner
UNITED STATES PATENTS

| | | |
|---|---|---|
| 422,914 | 3/1890 | Casto. |
| 2,027,560 | 1/1936 | Skillman. |
| 2,951,721 | 9/1960 | Asp. |
| 2,964,424 | 12/1960 | Mast. |
| 3,099,469 | 7/1963 | Gottschald. |
| 3,129,023 | 4/1964 | Fierstine. |
| 3,135,519 | 6/1964 | Ligon et al. |
| 3,147,014 | 9/1964 | Ohnstad. |
| 3,166,332 | 1/1965 | Olson. |

OTHER REFERENCES

Ehrenerich & Co., German application, 1,036,586 printed August 14, 1958 (K.L. 47b 13).

CARL W. TOMLIN, *Primary Examiner.*

A. V. KUNDRAT, *Assistant Examiner.*